United States Patent [19]
Bechtold et al.

[11] Patent Number: 5,338,596
[45] Date of Patent: Aug. 16, 1994

[54] PROCESS FOR PRODUCING A LEAD STORAGE BATTERY WITH A THIXOTROPIC GEL ELECTROLYTE

[75] Inventors: Dieter Bechtold, Bad Vilbel; Jürgen Vollbert, Hattersheim, both of Fed. Rep. of Germany

[73] Assignee: Varta Batterie Aktiengesellschaft, Hanover, Fed. Rep. of Germany

[21] Appl. No.: 996,737

[22] Filed: Dec. 24, 1992

[30] Foreign Application Priority Data

Jan. 30, 1992 [DE] Fed. Rep. of Germany ....... 4202497

[51] Int. Cl.$^5$ .......................................... H01M 10/10
[52] U.S. Cl. ...................... 429/190; 205/65; 205/6
[58] Field of Search ......................................... 429/190

[56] References Cited

U.S. PATENT DOCUMENTS 4,929,251  5/1990  Jache ................... 429/190

FOREIGN PATENT DOCUMENTS 0102531  8/1979  Japan ................... 429/190
2088623  5/1982  United Kingdom ........ 429/190

Primary Examiner—David B. Springer
Attorney, Agent, or Firm—Weiser & Associates

[57] ABSTRACT

A lead storage battery is filled with electrolyte in two steps. In a first step, the filling electrolyte is a sulfuric acid which does not contain a gelling agent, and the amount of electrolyte introduced into the battery casing is selected so that the electrolyte fills only the pores in the active compound of the electrodes and the pores of the separators (to the extent that they are capable of retaining the absorbed liquid by capillary action). In a second step, the filling electrolyte is a thixotropic mixture of sulfuric acid and silicic acid, which fills the remaining electrolyte space. The state of the electrode plates that are used (i.e., formed or unformed) determines the density of the sulfuric acid used in both portions of the filling process. In the case of formed plates, the density conforms to the normal final acid density for a charged storage battery. In the case of unformed plates, the acid is diluted so that the density reaches the normal final acid density during subsequent formation of the storage battery, which can be performed as a monobloc formation.

13 Claims, No Drawings

PROCESS FOR PRODUCING A LEAD STORAGE BATTERY WITH A THIXOTROPIC GEL ELECTROLYTE

BACKGROUND OF THE INVENTION

This invention generally relates to processes for producing lead storage batteries with a thixotropic gel electrolyte comprised of sulfuric acid and a gelling agent.

Essentially, there are two methods for introducing fixed sulfuric acid electrolyte into lead storage batteries. In a direct filling method, a freshly prepared thixotropic mixture of sulfuric acid, having a specific gravity which conforms to that of a normal filling acid, is combined with finely dispersed silicic acid as the gelling agent. In a two-step filling method, only the electrode plates together with the separators are first impregnated with a partial electrolyte, which is comprised of sulfuric acid without a gelling agent, and thereafter, free electrolyte space is filled with a phase of the electrolyte that exists as a thixotropic gel.

The problem with the direct filling method is that a sol-gel transformation of the introduced mixture immediately starts to occur. This gives rise to the danger that the pore openings in the plates will become clogged before the electrolyte has penetrated to the interior. This danger can be only partially eliminated by the application of a vacuum. What is more, there is still the disadvantage that the pore system of the plates and of the separators will be adversely affected by solidification of the sulfuric acid that has been absorbed.

The present invention is directed to the two-step filling method. Previously known variations of this method differ only with respect to the composition of the acid and gelling agent, the acid concentration, and the addition of intermediate partial charging and discharging steps. However, what these methods have in common is that there is a separate introduction of sulfuric acid containing no gelling agent into the plate and separator pores (by impregnation in an excess amount and removal of the excess) in a first step, followed by final filling of the storage battery case with a thixotropic filling electrolyte in a second step.

DE-PS 3,041,953 discloses that a well-defined amount of sulfuric acid can be electrochemically bound in the pores of the active compounds of the electrodes by filling the storage battery with a liquid sulfuric acid electrolyte and then discharging the battery. The remaining, freely mobile liquid electrolyte is then removed (by pouring it out). This removed electrolyte can then be used as a filling electrolyte after it has been mixed with a gelling agent. Once the storage battery has been filled with this mixture, it must then be brought into a state of operational readiness by recharging, which at the same time initiates the gelling process. However, this requires inversion of the cells for removal of the freely mobile electrolyte, and the required electrical treatments are time-consuming.

DE-PS 3,521,200 describes a filling process that avoids extra discharging/charging steps. However, this leaves the disadvantage that the cells must still be inverted during emptying. As a result of this, the cells are contaminated with acid. What is more, the filling of batteries that have already been connected is made more difficult, and the production process is retarded.

SUMMARY OF THE INVENTION

It is therefore the primary object of the present invention to provide a process for filling lead storage batteries with a thixotropic gel electrolyte, which does not suffer from the above-described deficiencies.

It is also an object of the present invention to provide a filling process which does not suffer from the above-described deficiencies, and which can be readily adapted to existing production processes.

It is also an object of the present invention to provide a filling process which does not suffer from the above-described deficiencies, and which further improves the electrical performance of the storage batteries with respect to voltage state and high-current capacity, as well as improving degassing.

These and other objects which will be apparent are achieved in accordance with the present invention by a two-step process for filling a lead storage battery with a thixotropic gel electrolyte comprised of sulfuric acid and a gelling agent in which, in a first step, the pores of the active compounds of the electrodes and the pores of the separators associated with the electrodes are impregnated with a limited amount of sulfuric acid containing no gelling agent, sufficient to fill the electrode pores and the separator pores, but only to the extent that the capillary-active pore system is able to retain the liquid that has been taken up so that essentially no freely mobile electrolyte is present in the cell, and in a second step, remaining electrolyte space within the cell is filled to its normal level with a phase of the electrolyte that exists as a thixotropic gel.

This process is particularly advantageous in its elimination of the burdensome intermediate step of tipping the cell cases to remove excess liquid electrolyte. Instead, the storage batteries are filled with electrolyte by a stepwise introduction of appropriate portions of the total amount necessary.

DETAILED DESCRIPTION OF THE INVENTION

The first step of the filling process calls for filling of the cell casing with a limited amount of sulfuric acid containing no gelling agent (silicic acid). The amount of sulfuric acid which is used should be sufficient to wet the electrode plates and separators so that the sulfuric acid fills at least all of the pores of the active material and, in addition, fills the pore volume of the separators to the extend that the separators (by virtue of their capillary activity) are able to completely absorb and retain free acid. This is the case with practically all microporous separators, such as separators made from plastic membranes or glass wool. In the case of corrugated separators, ribbed separators or perforated plates, only the actual separator sheets absorb acid, while the microscopic free spaces between the sheets (i.e., the holes or gaps formed between the ribs) remain unfilled.

Ordinarily, the amount of sulfuric acid which is added to the cell casing during the first step of the filling process will initially fill about one-third of the cell. After this first step in the filling process is completed, there will be substantially no freely mobile electrolyte present in the cell. It is particularly desirable to perform the first step of the filling process (i.e., the addition of electrolyte) in a vacuum. If this filling is performed under atmospheric pressure, it is advisable to allow the acid to act on the plates for about 1 to 2 hours.

The density of the sulfuric acid used in the first filling step (i.e., sulfuric acid that contains no gelling agent) should correspond to the density that such a battery acid would normally reach at the end of a charging cycle (e.g., 1.24 g/ml) provided that formed plates are used. However, if unformed plates are used, the density of the sulfuric acid should be selected so that the desired final concentration is reached during the formation process which is performed after the process has been completed (e.g., 1.18 g/ml).

The wetting of the cell components (the plates and separators) is then followed by the second step of the filling process, in which remaining free space of the cell is filled to its normal filling level. This free space may include the "macroporous" regions or gaps present between the plates due to spacers, or the free spaces present between the ribs of ribbed separators. To this end, a mixture produced by stirring powdered pyrogenic silicic acid (SiI) into sulfuric acid is preferably used. For reasons related to the mixing process, the use of an aqueous dispersion of silicic acid may also be advantageous.

The density of the sulfuric acid used in the second filling step (i.e., the electrolyte gel) depends on the state of the plates that are used. For plates that are already formed, a concentrated sulfuric acid is preferably used that has the operational acid density that is customary for use in a charged storage battery. For unformed plates, the sulfuric acid is preferably diluted to such an extent that it reaches the correct (end) concentration during the subsequent formation process. The second filling step can again be performed either in a vacuum or under atmospheric pressure. However, filling in a vacuum offers certain advantages in time, and better wetting is also achieved.

The sol-gel transformation of the thixotropic filling acid which then begins to occur will affect only the free electrolyte spaces which are being filled by this acid during the second filling step. The pores of the plates and of the separators which have already been filled with sulfuric acid containing no gelling agent, during the first filling step, are unaffected by such gelation.

At the end of the filling process of the present invention, the storage battery is virtually ready for use. Of course, formation is necessary when unformed plates are used instead of formed plates (i.e., plates that are charged and installed dry). The process of the present invention is itself unchanged by this. To this end, and immediately after the cell has been filled with electrolyte in accordance with the present invention, unformed plates can be formed in situ (i.e., as in monobloc formation). The SiI/$H_2SO_4$ mixture that was introduced during the second step of the filling process serves as the forming acid as well. As this mixture gradually gels, in the course of the formation process, an operationally ready storage battery is simultaneously obtained, with a finished gel electrolyte.

The foregoing filling process is extremely adaptable existing processes because it is adaptable to different types of plates, as well as to different cell types, even if special adjustment of the acid concentration and/or the concentration of the gelling agent is required. The range of application of the present invention is correspondingly extensive and includes practically all lead-acid batteries with fixed electrolytes, including starter batteries, traction batteries, stationary batteries and batteries of special design.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for filling a lead storage battery including a plurality of electrodes and a plurality of separators associated with the electrodes with a thixotropic gel electrolyte comprised of sulfuric acid and a gelling agent, comprising the steps of:
    impregnating pores of the electrodes and pores of the separators with a first phase of the electrolyte which does not contain the gelling agent, in an amount which is sufficient to fill substantially all of the pores of the electrodes and substantially all of the pores of the separators only to an extent that a capillary-active pore system is able to retain the sulfuric acid containing no gelling agent, so that substantially no freely mobile electrolyte is present in the storage battery; and thereafter,
    filling remaining electrolyte space within the storage battery with a second phase of the electrolyte which contains a gelling agent, so that the storage battery is filled to a normal level with the sulfuric acid containing the gelling agent.

2. The process of claim 1 wherein the electrodes are formed, and wherein the sulfuric acid containing no gelling agent has a density which is approximately equal to the density of a final acid in a lead storage battery, after charging.

3. The process of claim 2 wherein the electrodes are unformed, and wherein the sulfuric acid containing no gelling agent has a density selected so that the sulfuric acid containing no gelling agent will have a density which is approximately equal to the density of a final acid in a lead storage battery, after formation.

4. The process of claim 1 which further comprises the step of introducing the sulfuric acid containing no gelling agent in a vacuum.

5. The process of claim 1 which further comprises the step of preparing the second phase of the electrolyte by stirring a pyrogenic silicic acid with sulfuric acid.

6. The process of claim 5 wherein the electrodes are formed, and wherein the sulfuric acid has a density which is approximately equal to the density of a final acid in a lead storage battery, after charging.

7. The process of claim 5 wherein the electrodes are unformed, and wherein the sulfuric acid has a density selected so that the sulfuric acid will have a density which is approximately equal to the density of a final acid in a lead storage battery, after formation.

8. The process of claim 5 which further comprises the step of introducing the sulfuric acid containing the gelling agent in a vacuum.

9. The process of claim 1 wherein the electrodes are unformed, and which further comprises a monobloc formation of the electrodes following the filling process.

10. A process for filling a lead storage battery including a plurality of electrodes and a plurality of separators associated with the electrodes with a thixotropic gel electrolyte comprised of sulfuric acid and a gelling agent, comprising the steps of:
    impregnating pores of the electrodes and pores of the separators with a first phase of the electrolyte which does not contain the gelling agent, in an amount wherein substantially no freely mobile electrolyte is present in the storage battery; and thereafter, filling remaining electrolyte space within the storage battery with a second phase of the electrolyte which contains a gelling agent, so that the storage battery is filled to a normal level with the sulfuric acid containing the gelling agent.

11. The process of claim 10 wherein the filling process is performed without inverting the storage battery.

12. In a process for filling a lead storage battery including a plurality of electrodes and a plurality of separators associated with the electrodes with a thixotropic gel electrolyte comprised of sulfuric acid and a gelling agent, wherein the process includes the steps of impregnating pores of the electrodes and pores of the separators with a first phase of the electrolyte which does not contain the gelling agent, and thereafter filling remaining electrolyte space within the storage battery with a second phase of the electrolyte which contains the gelling agent, the improvement which comprises:

impregnating the pores of the electrodes and the pores of the separators with an amount of the first phase of the electrolyte which is sufficient to fill substantially all of the pores of the electrodes and substantially all of the pores of the separators only to an extent that a capillary-active pore system is able to retain the first phase of the electrolyte, and so that substantially no freely mobile electrolyte is present in the storage battery; and thereafter, filling the remaining electrolyte space within the storage battery with the second phase of the electrolyte, so that the storage battery is filled to a normal level.

13. The process of claim 12 wherein the filling process is performed without inverting the storage battery.

* * * * *